Oct. 21, 1947.        J. A. SAVAGE        2,429,372
METALLIC ORE SINTERING FURNACE
Filed Nov. 5, 1945        2 Sheets-Sheet 1

INVENTOR.
John A. Savage.
BY Geo. Stevens.
atty.

Patented Oct. 21, 1947

2,429,372

UNITED STATES PATENT OFFICE 2,429,372

METALLIC ORE SINTERING FURNACE

John A. Savage, Deerwood, Minn.

Application November 5, 1945, Serial No. 626,795

6 Claims. (Cl. 266—20)

This invention relates to a method of and furnace for the sintering, clotting, agglomeration, agglutination or fusion hereinafter referred to only as sintering of especially what are known as fine mesh taconite iron ore concentrates or other finely divided iron ore, or pyritic ore, blast furnace flue dust, or any other fine mesh metallic ores or materials, to which a fluxing material may be added, hereinafter called "ore materials."

This application is a continuation-in-part of my copending application Ser. No. 618,028.

One of the principal objects of the instant invention is to provide a device wherein finely divided metallic ores may, by a simple continuous process, be very economically sintered to a physical state ideally adapted for ultimate smelting in a blast furnace after all volatile constituents are volatilised and removed, and one that requires comparatively, a very low investment in plant cost and maintenance per ton of product.

In this sintering various constituents such as chemical water, carbon dioxide, sulphur, etc., will be driven off.

Another object of that phase of the invention residing in the peculiar shape of the furnace is to secure maximum efficiency and uniformity of heat by a continuous upward flow of the properly chemically proportioned, weighed and commingled finely divided ore materials thoroughly mixed with one or more of the following chemically weighed fuels: coal, coke, peat, wood, wood shavings, wood sawdust, fuel oil, products of petroleum or other distillations, which mixture of ore materials and fuel will hereinafter be called the "charge."

Still another object is to provide a fusion furnace so designed that a battery of same may discharge their product of sinters upon a single endless pan conveyor and which pan conveyor may discharge the product to a screening plant, quenching device, storage or for direct shipment.

A further object is to provide a form of fusion furnace and process of sintering therein a properly chemically proportioned and weighed charge so that entirely or almost entirely the fines otherwise needing to be screened out and returned into the charge may be eliminated.

Another object is to provide simple means for introduction of air or oxygen or other gas when desired, directly into and with the charge as it enters the hearth or fuse box of the oven to aid in aerating and diffusing said charge axially thereof.

Furthermore, it is to be noted that this upward movement of a thoroughly mixed charge provides a method whereby all metallic particles are subjected to fusion producing heat in a most even and thorough manner because the churning movement of the charge in the fusion chamber and oven is most complete, and because the charge continues such movement while the expanding burning gases from the thoroughly mixed fuel tend to heat equally each particle.

This feature of porosity is thorough and complete within the upward lifting and churning charge, and thus each and every metallic particle is evenly heated which condition is ideal preliminary to the agglutination sought in this process.

Another feature given careful consideration is that of the possibility of burning out the metal hearths of the ovens which it is deemed amply cared for by the provision of adequate cold air, oxygen or other gases entering directly within and adjacent the initial combustion zone of the oven, and thus coacting with the unheated charge to eliminate any liability of over-heating the hearth.

In the accompanying drawings forming part of this application, and in which like reference numerals indicate like parts:

It is well known that many experiments have been made, and various designs of furnaces, systems and processes respecting the art of so-called sintering of metallic ores have been patented, however, it is deemed that all have overlooked the simplicity and practicability of the instant invention.

Figure 1:
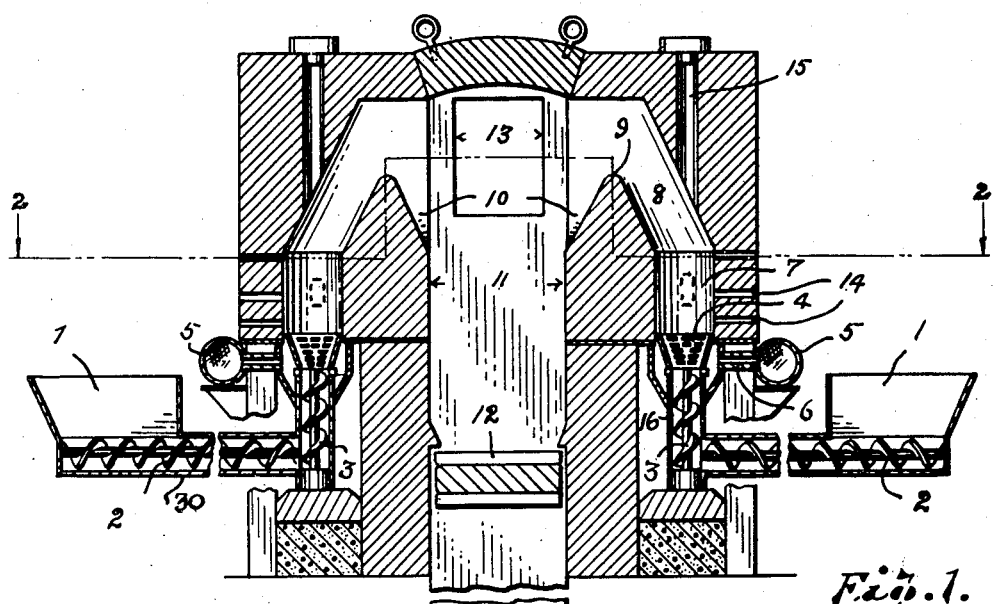
Fig. 1 is a vertical sectional view through one of my improved twin hearth furnaces.

While the broader concept of my invention involves the specific combination of the plurality of such units, and each unit individually comprises two like coactive fusion devices, I will proceed to describe but one of such and its relationship to its coactive mate, as particularly disclosed in Fig. 1 of the drawings.

Figure 2:
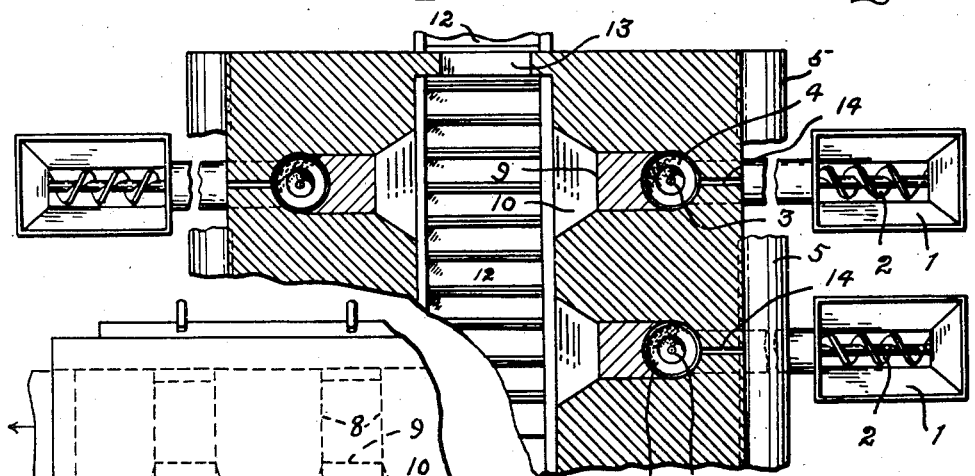
Fig. 2 is a fractional diagrammatic sectional view of two of such furnaces taken on the line 2—2, Fig. 1.
Figure 3:
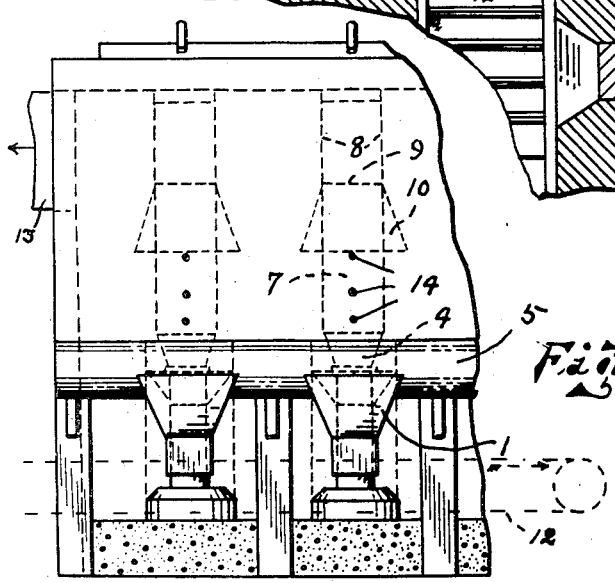
Fig. 3 is a fractional side elevational view of a battery of said units.

However, it is to be understood that in the event of a combination or battery installation of the ovens being assembled as illustrated in Figs. 2 and 3 of the drawings, it may prove advantageous, principally because of differences in the constituents of the charge to change the relative proportions of different parts of the unit as well as size and shape thereof, without departing from the spirit of the invention as claimed.

Referring now to the drawings, numeral 1 designates a receptacle into which the charge of ore and fuel is received continuously and fed therefrom by a variable speed screw conveyor 2 within conduit 30 to the variable speed vertical screw conveyor 3 within conduit 16 which carries the charge continuously upward into the cast iron fusion box or hearth 4. Here the charge meets a measured quantity of air, oxygen or other gases coming from blast pipe 5 through blowpipe 6 and then through holes in the inner inverted cone shaped fusion box or hearth 4.

The charge then proceeds directly upwardly through the cylindrical crucible chamber 7 and then into the inclined chamber 8 and finally passing over the apex 9 whereupon it drops via the flared discharge opening 10 into the longitudinal chamber 11 and onto pan conveyor 12, which pan conveyor may be moving at a regulated speed towards the discharge end of the battery which direction is preferably opposite to the direction of the movement of the gases towards stack breeching 13.

The initial firing of the charge in fusion box 4 may follow a preliminary burning of fuel only in the fusion box 4 and lower portion of the oven chamber 7, which firing may be initiated by a flame blown in through the peek holes or tuyères 14 or by dropping ignited material down through poke hole 15.

Soon after the initial firing, the percentage of ore materials in the charge may be gradually increased, until it reaches the maximum percentage efficient sintering operation may permit.

The sintering in zone 7 above fusion box 4 may be augmented by the introduction of either gas, fuel oil, powdered coal, air, oxygen or other gases through the peek holes or tuyères 14. It also may be noted that electric energy may be employed in the sintering process within the furnace without departing from the spirit of my invention.

Figure 4:
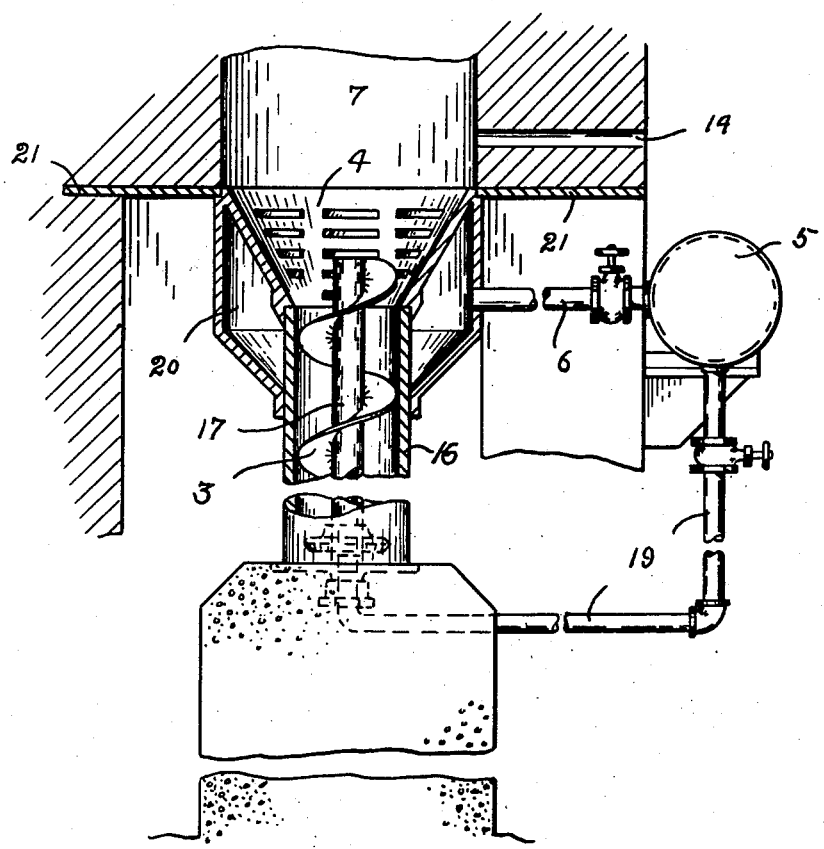
Fig. 4 is a somewhat enlarged fragmental section and elevational view of a modified form of entrance of the charge into the fusion box or hearth.

In Fig. 4 I have illustrated a slightly enlarged modified form of entrance for the discharge into the hearth or fusion box 4 of the oven and one in which air or gas may be admitted directly with the finely divided charge particularly for the purpose of aiding in as complete combustion and uniform heating of the entire charge as possible.

This is accomplished by providing a hollow type of axial shaft 17 for the vertical conveyor screw 3 and having same project somewhat into the bottom of the inner hearth 4 as clearly shown and this hollow shaft 17 is connected with the fixed air or gas supply pipe 19 leading from a suitable independent blast pipe of its own, not shown or if preferred, provided with a controlled connection direct from the air or gas blast pipe 5, as shown.

It is further to be noted that in this type of combined inner hearth 4 and outer hearth wall 20 it may be desirable to install within the vertical walls of the oven a horizontally disposed metal or other suitable reenforcing plate 21 preferably occurring at the juncture of these inner and outer inverted cone-shaped walls 4 and 20, thus forming an exceptionally substantial installation for such a furnace and one free from disturbance and malfunctioning by unequal contraction and expansion of said walls if not so reenforced.

Having thus described one practical embodiment of the invention and the method deemed to produce novel results, what I claim is:

1. In a twin hearth sintering furnace of the type described, a central well chamber intermediate of said hearths and communicating with same upon opposite sides thereof, a charge feeding device including a double walled frusto-conical mixing chamber for each hearth, the innermost of said walls being pervious, separate and independent ignition and control means for each hearth, a fusion chamber above each hearth communicating with said central chamber, a depository in the well part of said central chamber and a stack conduit for said central chamber.

2. In a furnace for sintering metallic ores having a double inverted frustroconically shaped hearth therein; a horizontally disposed reenforcing plate incorporated within the walls of said furnace and aiding in the support of said hearth and said furnace walls and fluid conducting means axially of said hearth.

3. In a metallic ore sintering furnace having a double walled hearth therein, the innermost one of said walls being pervious for the reception of fluid wholly thereabouts from the space intermediate of said walls, a fluid supply leading through said outer wall into said space, a combined charge and fluid supply leading through the bottom of both said walls and directly into said innermost pervious portion of said hearth.

4. In an ore sintering furnace having a pervious hearth therein, a fluid supply for passage through the perforations of said hearth and a combined fluid and charge supply for said hearth through the bottom thereof.

5. In a furnace for sintering metallic ores having a fusion hearth therein including a double walled mixing chamber, the innermost of said walls being pervious, vertically disposed charge conveying means feeding directly into the bottom of said hearth, and auxiliary discharge means directly associated with said charge, so constructed and arranged as to introduce a combustion aiding fluid into said charge while being fed into said hearth.

6. In a furnace for sintering metallic ores having a fusion hearth therein; vertically disposed charge conveying means feeding directly into the bottom of said hearth, and auxiliary discharge means directly associated with said charge and said hearth so constructed and arranged as to introduce a combustion aiding fluid into said charge both axially and circumferentially while same is being fed into said hearth, said hearth including a double walled frusto-conical mixing chamber, the innermost of said walls being pervious.

JOHN A. SAVAGE.

REFERENCES CITED

The following references are of record in the file of this patent:

UNITED STATES PATENTS

| Number | Name | Date |
|---|---|---|
| 1,957,347 | McKinnon | May 1, 1934 |
| 65,914 | Hughes | June 18, 1867 |
| 675,516 | McCormack | June 14, 1901 |
| 1,139,708 | Niedergesaess | May 18, 1915 |
| 2,371,191 | Sherman | Mar. 13, 1945 |
| 2,378,805 | Spicer et al. | June 19, 1945 |
| 2,070,237 | Mullen | Feb. 9, 1937 |